(12) United States Patent
Micka et al.

(10) Patent No.: US 6,611,901 B1
(45) Date of Patent: Aug. 26, 2003

(54) METHOD, SYSTEM, AND PROGRAM FOR MAINTAINING ELECTRONIC DATA AS OF A POINT-IN-TIME

(75) Inventors: William Frank Micka, Tucson, AZ (US); Yoram Novick, Haifa (IL); David Michael Shackelford, Tucson, AZ (US)

(73) Assignee: International Business Machines Corporation, New York, NY (US)

( * ) Notice: Subject to any disclaimer, the term of this patent is extended or adjusted under 35 U.S.C. 154(b) by 0 days.

(21) Appl. No.: 09/347,344

(22) Filed: Jul. 2, 1999

(51) Int. Cl.$^7$ .............................................. G06F 12/00
(52) U.S. Cl. ........................ 711/162; 711/113; 711/202
(58) Field of Search ................................. 711/162, 113, 711/112, 202

(56) References Cited

U.S. PATENT DOCUMENTS

| | | | |
|---|---|---|---|
| 4,750,106 A | | 6/1988 | Aiken, Jr. |
| 5,008,786 A | * | 4/1991 | Thatte .......................... 711/162 |
| 5,241,668 A | | 8/1993 | Eastridge et al. |
| 5,274,807 A | | 12/1993 | Hoshen et al. |
| 5,321,832 A | | 6/1994 | Tanaka et al. |
| 5,394,539 A | | 2/1995 | Neuhard et al. |
| 5,403,639 A | * | 4/1995 | Belsan et al. ................ 707/204 |
| 5,504,857 A | | 4/1996 | Baird et al. |
| 5,604,902 A | | 2/1997 | Burkes et al. |
| 5,623,669 A | | 4/1997 | Kincaid |
| 5,664,186 A | | 9/1997 | Bennett et al. |

OTHER PUBLICATIONS

IBM Corporation, International Technical Support Organization, "Implementing Concurrent Copy", Document No. GG24–3990–00, Dec. 1993, pp. 1–11.

Alison Pate et al., IBM Corporation, International Technical Support Organization, "Implementing SnapShot", Document No. SG24–2241–01, Jul. 1999, pp. 1–41.

* cited by examiner

*Primary Examiner*—Matthew Kim
*Assistant Examiner*—Matthew D. Anderson
(74) *Attorney, Agent, or Firm*—David W. Victor; Konrad Raynes Victor & Mann

(57) ABSTRACT

Disclosed is a method, system, program, and data structures for maintaining electronic data at a point-in-time. A first data structure indicates point-in-time data at one of a first storage location and a corresponding second storage location. A second data structure indicates point-in-time data at one of a first storage location and corresponding second storage location. A first relationship data structure indicates a relationship between the first storage location and corresponding second storage location and a second relationship data structure indicates a relationship between the first storage location and second storage location. A request to process the first storage location is processed by processing the first relationship data structure to determine the corresponding second storage location for the first storage location and processing the first data structure to determine whether data at the first storage location was transferred to the second storage location. A request to process the second storage location is processed by processing the second relationship data structure to determine the corresponding first storage location for the second storage location and processing the second data structure to determine whether the point-in-time data at the first storage location was transferred to the second storage location.

44 Claims, 12 Drawing Sheets

METHOD, SYSTEM, AND PROGRAM FOR MAINTAINING ELECTRONIC DATA AS OF A POINT-IN-TIME

BACKGROUND OF THE INVENTION

1. Field of the Invention

A method, system, program, and data structures for maintaining electronic data at a point-in-time and, in particular, copying point-in-time data from a first storage location to a second storage location.

2. Description of the Related Art

Data storage systems often include a feature to allow users to make a copy of data at a particular point-in-time. A point-in-time copy is a copy of the data consistent as of a particular point-in-time, and would not include updates to the data that occur after the point-in-time. Point-in-time copies are created for data duplication, disaster recovery/business continuance, year 2000 testing, decision support/data mining and data warehousing, and application development and testing.

One data duplication technique for copying a data set at a particular point-in-time is the International Business Machines Corporation's ("IBM") Concurrent Copy feature. Concurrent Copy performs back-up operations while allowing application programs to run. Concurrent Copy insures data consistency by monitoring input/output (I/O) requests to the tracks involved in the Concurrent Copy operation. If an I/O request is about to update a track that has not been duplicated, then the update is delayed until the system saves a copy of the original track image in a cache side file. The track maintained in the side file is then eventually moved over to the target copy location. Concurrent Copy is implemented in a storage controller system, where the storage controller provides one or more host systems access to a storage device, such as a Direct Access Storage Device (DASD), which is comprised of numerous interconnected hard disk drives. With Concurrent Copy, data is copied from the DASD or sidefile, to the host system initiating the Concurrent Copy operation, and then to another storage device, such as tape back-up.

Concurrent Copy is representative of a traditional duplication method in which the source data to copy is read from the disk into the host. The host then writes a duplicate physical copy back to the receiving disk. This method uses substantial processing cycles to perform the I/O operations for the copying and disk storage, and can take considerable time. In fact, the amount of time and resources consumed are directly proportional to the amount of data being copied. The larger the size of the data, the more resources, and time, used. Further details of the Concurrent Copy operation are described in the IBM publication, "Implementing Concurrent Copy," IBM document no. GG24-3990-00, (IBM Copyright, December 1993), which publication is incorporated herein by reference in its entirety.

Another data duplication technique for storage controller systems is the IBM SNAPSHOT program. SnapShot is intended for use with the IBM RAMAC Virtual Array or ICEBERG disk storage systems. Such systems provide a virtual disk architecture, also referred to as Log Structured Array (LSA) system, in which mappings provide virtual locations of the data. LSA tables map host tracks to disk array storage locations where the data is stored. When data is written to the system, it is compressed and compacted, assembled into fixed blocks, and written to the DASD. All write operations in virtual disk architecture are always directed to a new place in the disk array. SnapShot operates by copying the LSA pointers to the data, and not copying the actual data. Thus, after a SnapShot copy is made, there are two sets of pointers to the same data. Further details of the SnapShot operation are described in the IBM publications "Implementing Snapshot," IBM document no. SG24-2241 (IBM Copyright, November 1997); "Using RVA and Snap-Shot for Business Intelligence Applications with OS/390 and DB2, "IBM document no. SG24-5333-00 (IBM Copyright, August 1998).

SnapShot is considered advantageous over traditional disk copy operations, such as Concurrent Copy methods. SnapShot uses substantially less disk space and I/O processing. Further, SnapShot requires substantially less time to make the copy than traditional disk copy operations because SnapShot just makes a copy of the logical pointers to the data being copied, and not a physical copy of the data. Eliminating I/O operations to copy the actual data, allows a SnapShot copy to be completed almost instantaneously. Once the pointers are copied, the SnapShot copy is complete.

Although, SnapShot has proved to be an advantageous program for point-in-time copies, SnapShot only operates on a virtual disk architecture, such as an LSA architecture, where tables of pointers to the data are maintained and available for duplication.

There is thus a need in the art to provide improved point-in-time copy methods to systems that do not have an LSA type virtual array, as well as LSA type data systems that utilize virtual arrays.

SUMMARY OF THE PREFERRED EMBODIMENTS

To overcome the limitations in the prior art described above, preferred embodiments disclose a method, system, program, and data structures for maintaining electronic data at a point-in-time. A first data structure indicates point-in-time data at one of a first storage location and a corresponding second storage location. A second data structure indicates point-in-time data at one of a first storage location and corresponding second storage location. A first relationship data structure indicates a relationship between the first storage location and corresponding second storage location and a second relationship data structure indicates a relationship between the first storage location and second storage location. A request to process the first storage location is processed by processing the first relationship data structure to determine the corresponding second storage location for the first storage location and processing the first data structure to determine whether data at the first storage location was transferred to the second storage location. A request to process the second storage location is processed by processing the second relationship data structure to determine the corresponding first storage location for the second storage location and processing the second data structure to determine whether the point-in-time data at the first storage location was transferred to the second storage location.

In further embodiments, the point-in-time data is copied from the first storage locations to the second storage locations. In such case, the first and second data structures are modified to indicate that point-in-time data copied from the first storage location to the second storage location is not located at the first storage location and is located at the second storage location.

In still further embodiments, the point-in-time data is not copied from the source to the target unless an update is made to a first location including the point-in-time data. In such case, the point-in-time data to update at the first storage location is copied to the corresponding second storage location. The first and second data structures are modified to indicate that the point-in-time data to update is at the second storage location. Further, in preferred embodiments, data is copied from the source to target by copying the data from the source location in cache to the target location in cache. Upon destage, the point-in-time data at the target location in cache is transferred to the target storage device.

The preferred embodiment data structures are used to establish the location of point-in-time data that is copied from a first or source location to a second or target location. With preferred embodiments, after setting up the data structures, the data does not have to be copied unless source data is updated or data is requested from the source location. In such case, the point-in-time data is copied over to insure that a copy of the point-in-time data is maintained. The transfer of data preferably involves the movement of data to cache and then to the target location. The preferred embodiments thus avoid I/O operations to physically copy all the data from the source to target locations. With preferred embodiments a relationship between the source and target locations is established to allow the system to operate as if a copy of the point-in-time data is maintained at the target locations.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Computing Environment

Figure 1:
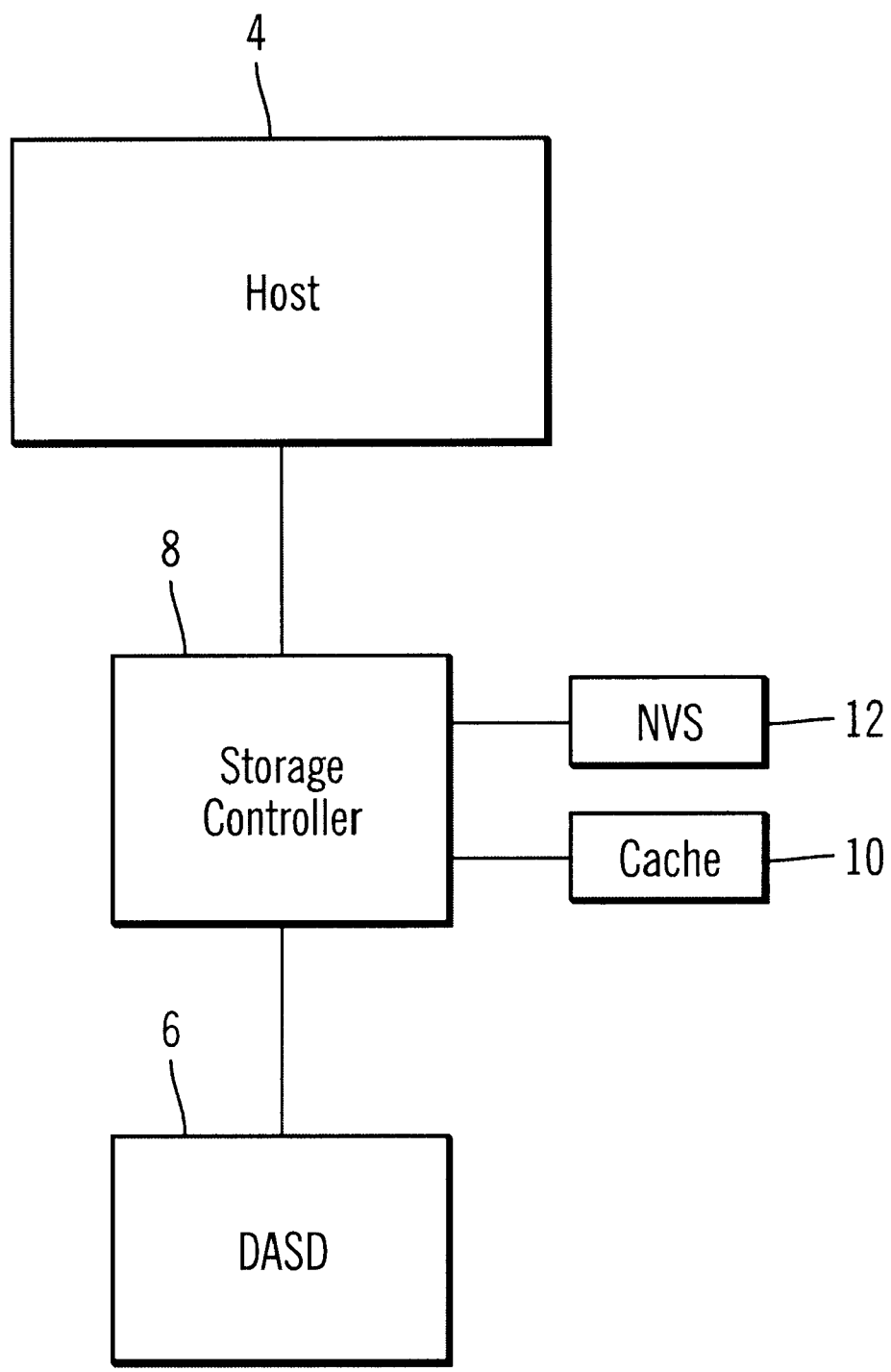
FIG. 1 is a block diagram illustrating a computing environment in which preferred embodiments of the present invention are implemented.

FIG. 1 illustrates a computing environment in which preferred embodiments are implemented. A host computer 4 performs data operations with respect to a DASD 6 via a storage controller 8 which manages access to the DASD 6. The storage controller 8 includes a cache 10. The storage controller 8 stages data from the DASD 6 into corresponding locations in the cache 10 that the host 4 requests. Similarly, data updates to tracks in the DASD 6 are stored in corresponding locations in the cache 10 until the data is destaged from cache 10 to DASD 6. The storage controller 8 may also copy any data updates written to cache 10 to a non-volatile storage unit (NVS) 12 to maintain for data recovery purposes. The NVS 12 is typically comprised of a battery backed-up volatile memory that can store the data updates for several hours in the event of a system failure.

The storage controller 8 may be comprised of the IBM 3990 Storage Controller, described in IBM publication, "IBM 3990 Storage Control Reference (Models 1, 2, and 3), IBM document no. GA32-0099-06 (Copyright IBM Corp. 1988, 1994), which publication is incorporated herein by reference in its entirety or the storage controller and host architecture described in the commonly assigned patent applications "Method And System For Dynamically Assigning Addresses To An Input/Output Device," by Brent C. Beardsley, Allan S. Merritt, Michael A. Paulsen, and Harry M. Yudenfriend, filed on Oct. 7, 1998, and having U.S. patent Ser. No. 09/167,782; and "System For Accessing An Input/Output Device Using Multiple Addresses," by Brent C. Beardsley, James L. Iskiyan, James McIlvain, Phillip R. Mills, Michael A. Paulsen, William G. Thompson, Harry M. Yudenfriend, filed on Oct. 7, 1998, and having U.S. patent Ser. No. 09/168,017, which patent applications are incorporated herein by reference in their entirety.

The host 4 may be comprised of any type of computing device, such as a mainframe computer, that includes a computing architecture capable of communicating input/ output (I/O) commands to the storage controller 8, such as the IBM ESA/390** System described in the IBM publication: "Enterprise Systems Architecture/390: ESCON I/O Interface," IBM document no. SA22-7202-02 (Copyright IBM Corp., 1990, 1991, 1992).

The DASD 6 may store data in a Count-Key-Data (CKD) format or fixed block format, such as the SCSI format. In the CKD format, each track includes one or more data records that are each prefaced with CKD information. The CKD information provides the name and format of a record, the key length, and the data length. The key field, which is optional and unrelated to the index key used to provide logical ordering to the application program 8 records, is used for searching and may indicate the last data set in the record. The data field provides a variable length record of user data sets. The number of CKD records that can be placed on a track depends on the length of the data areas of the records. Physical locations on the DASD 6 are identified according to cylinder, track, and the record on the track, i.e., CCHHR, where CC indicates the cylinder, HH indicates the track, and R indicates the record on the track. With the CKD format, the storage controller addresses records in the DASD 6 using the CCHHR location identifier. Alternatively, the DASD 6 may store data in addressable fixed blocks of data. In yet further embodiments, the DASD 6 may store data in any addressable storage unit known in the art, including CKD and FBA.

Preferred embodiments may be implemented using either the CKD and/or FBA architecture in systems that update data in place. This means that any updates to data in the DASD 6 are written directly to the same position on the physical space of the DASD 6 where the data to update resides. Alternatively, in embodiments utilizing the FBA architecture in a LSA system, data is stored in a compressed format on the DASD 6 and updates to data are written at the end of the file or last data track. The original data that was the subject of the update is then invalidated. In a virtual array such as LSA, the DASD 6 appears to the host 4 as an IBM 3990 type system with volumes of data defined according to CCHH locations. These volumes that appear to the host 4 are referred to as functional devices. The storage controller 8 maintains tables to map the functional devices or volumes the host 4 views to physical location in the DASD 6. If data is updated, then that new updated data is stored at a new location in the DASD 6, and the storage controller 8 updates the tables to have the functional device point to the new location storing the updated data. In this way, the host 4 always references the data according to a CCHH location that remains unchanged. The storage controller 8 maintains tables to map the host 4 view to actual fixed blocks on the DASD 6.

Data Structures For Point-in-Time Copying

Preferred embodiments include various data structures the storage controller 8 builds when the host 4 initiates a point-in-time copy operation. The host 4 would generate a command to take a point-in-time copy of certain tracks or data sets at a particular moment. A point-in-time copy operation involves copying data from source tracks or areas to target tracks or areas. The source and target locations may be in the same or different logical volumes, or on the same or different physical storage devices, i.e., DASDs.

The host system 4 initiates a point-in-time copy operation on an extent, i.e., consecutive range of tracks, to preserve a copy of the data in the extent as of a particular time by specifying the source of the extent of tracks subject to the point-in-time copy and target tracks which will maintain a copy of the source tracks. The source tracks are referred to as the protected tracks. In response to this command, the storage controller 8 generates source and target bit map data structures having bit map values that correspond to the tracks at the respective source and target physical locations in DASD 6. A bit map value of "on" or binary one indicates that the protected tracks at the point-in-time reside at the source physical location in DASD 6.

Figure 2:
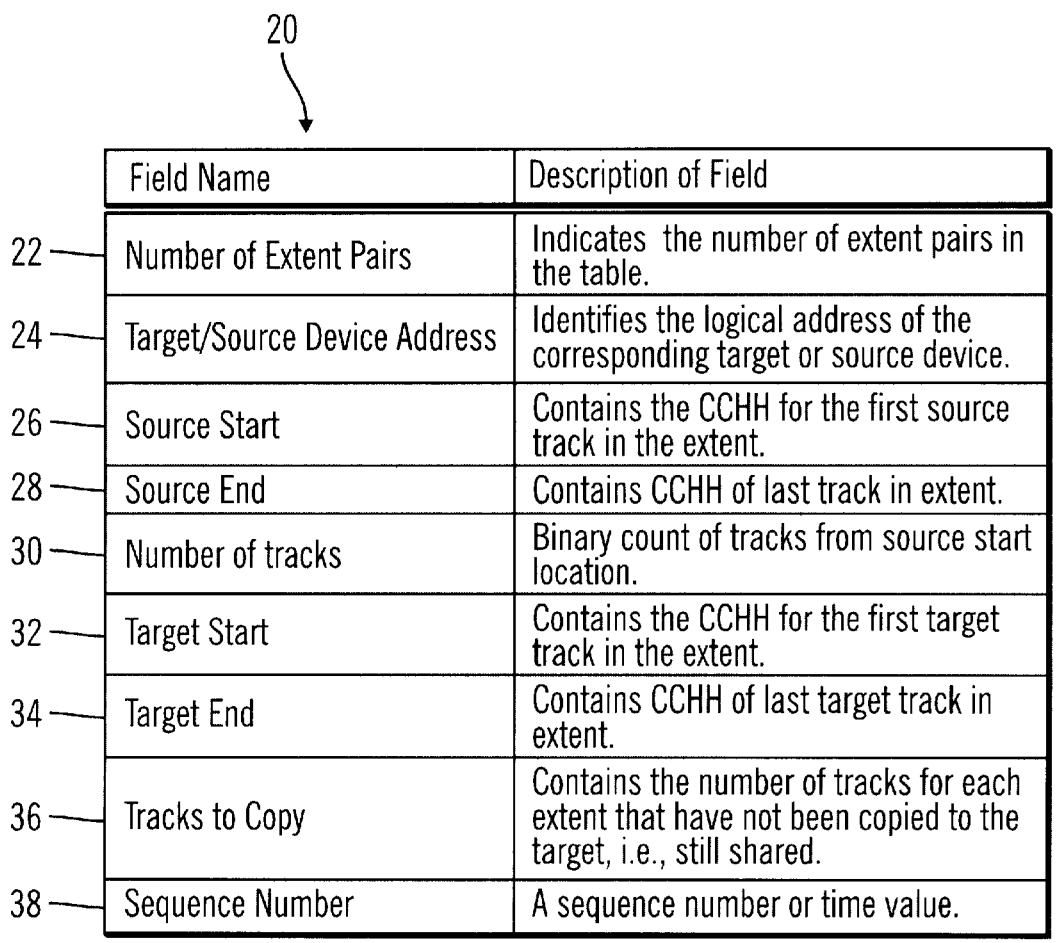
FIG. 2 illustrates a block diagram of a relationship table in accordance with preferred embodiments of the present invention.

The storage controller 8 further generates a relationship table for each bit map that provides a mapping of the locations in the bit map to the source and target locations in DASD 6 of the data subject to the point-in-time copy. FIG. 2 illustrates the fields in both the source and target relationship tables. The relationship table is used in conjunction with the bit map to determine the status of protected tracks, the source location of the protected tracks the bit map represents, and the location of the target for the protected tracks. An extent number field 22 indicates the number of extent pairs in the table. An extent pair comprises each group of continuous protected tracks maintained at the source location having corresponding tracks at the target location, i.e., a source/target pair. Within a range of tracks subjected to a point-in-time copy operation, there may be multiple extents of consecutive tracks at different source locations. A copy operation may involve multiple extent pairs if the source tracks for target tracks are located on different devices or logical volumes. The relationship table 20 maintains information in fields 24–34 for each extent pair indicated by the extent number 22. The device address 24 indicates the logical address of the physical storage for the corresponding target or source tracks. The source start 26 has the CCHH, FBA or location of the first source track in the extent and the source end 28 has the last protected track.

The number of tracks 30 indicates the number of contiguous protected tracks to be copied from the source to the target for that extent. Each bit map value, from the first to last, corresponds to the protected tracks maintained in the range of tracks between the source 26, 28 and target 32, 34 start and end. The tracks to copy field 36 indicates the number of tracks for each extent that have not been copied to the target, i.e., are still shared. The sequence number 38 is a time value indicating a time or sequence when the information for an extent pair, i.e., a set of fields 22–34, was generated into the relationship table with respect to previous extent pairs in the relationship table.

Figure 3A:
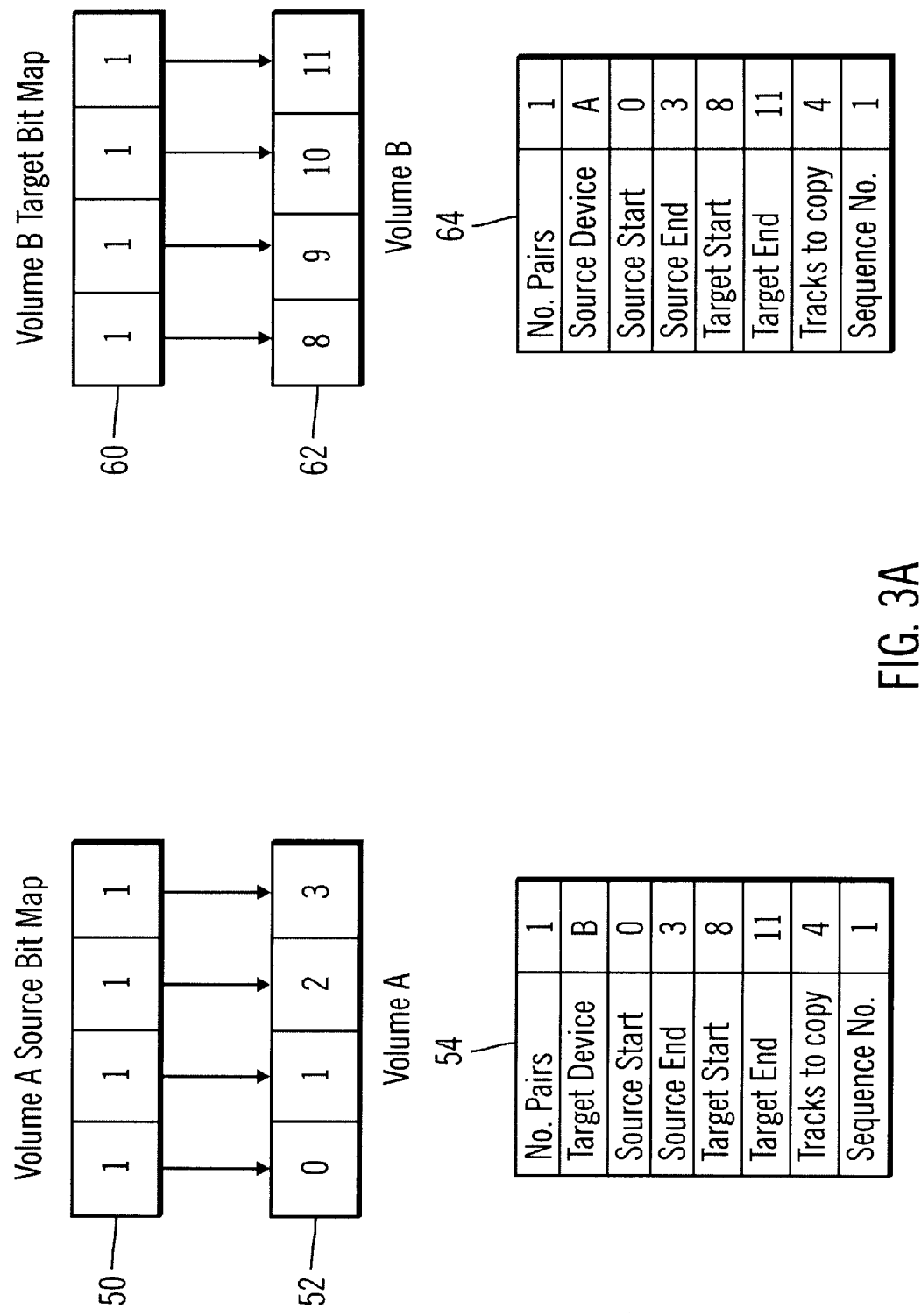
FIGS. 3a, b illustrate block diagrams of data structures in accordance with preferred embodiments of the present invention.

The purpose of both the bit map data structures and relationship tables are to allow an instant copy of source data to be made, without having to perform actual data copy operations that can consume system resources and interfere with host 4 access to the data. FIGS. 3a, b illustrate the result of initial point-in-time copy operation in accordance with the preferred embodiments. In the example of FIG. 3a, a point-in-time copy request from source tracks 0, 1, 2, and 3 in Volume A are made to target tracks 8, 9, 10, and 11 in Volume B. In response the storage controller 8 creates a source 50 and target 60 bit maps having bit map values corresponding to each of the tracks on the source 52 and target 54 devices, respectively. A one or "on" value indicates that the point-in-time copy is on the source track and a zero indicates that the point-in-time copy has been copied from the source track location to the target. The storage controller 8 would further generate source 54 and target 64 relationship tables. The source relationship table 54 for the source tracks 52 indicates that the target of the point-in-time copy is target device B, and the track ranges for the source and target. The target relationship table 64 includes the same information, except that the target table 64 indicates the source device A as the target. These relationship tables 54, 64, provide information on the protected tracks for the source and target locations.

Figure 3B:
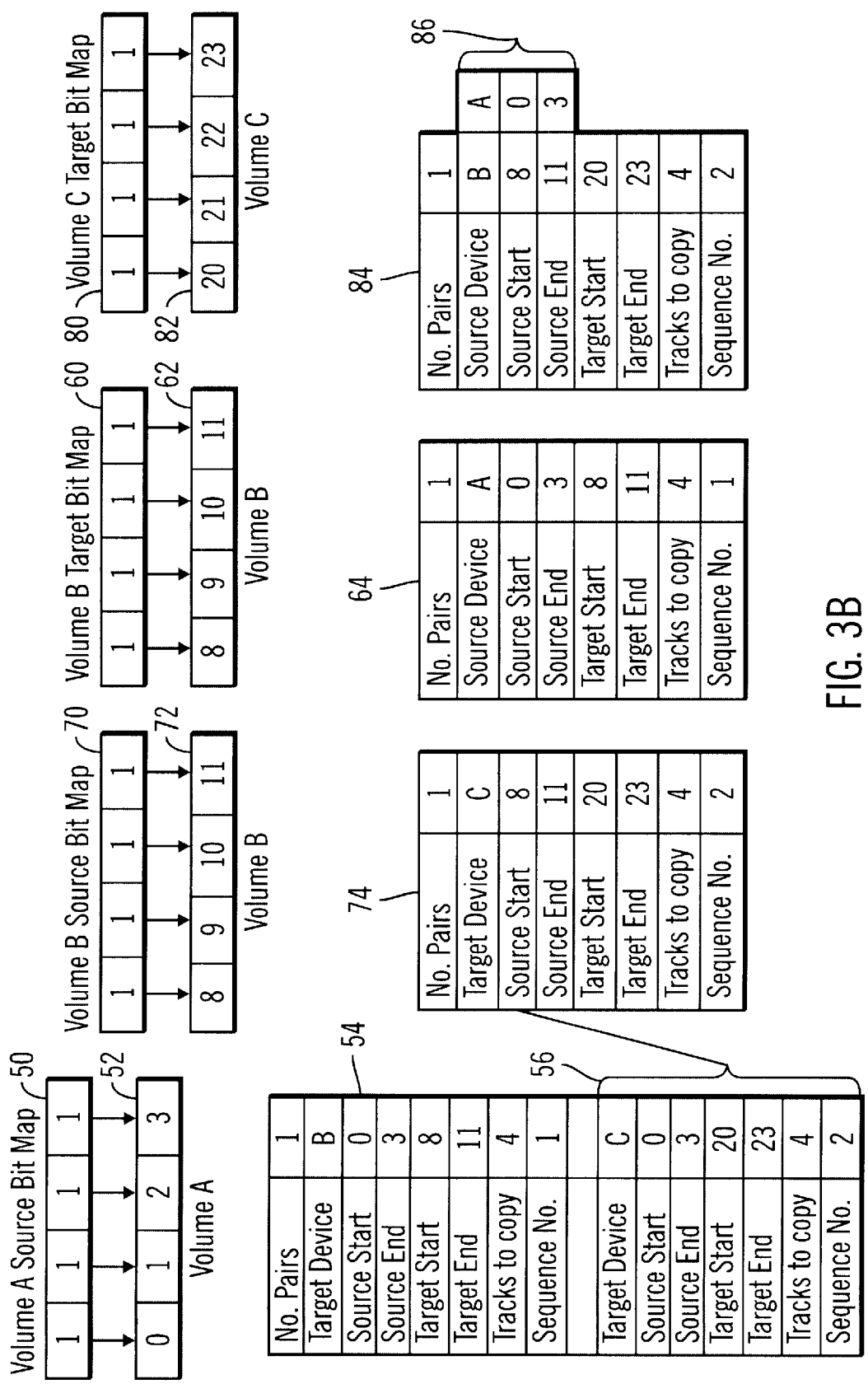

FIG. 3b illustrates the affect on the relationship tables of an additional point-in-time copy operation to create a second point-in-time copy from volume B to volume C after creating a point-in-time copy of volume A to B, as shown in FIG. 3a. In FIG. 3b, the host 4 requests a second point-in-copy operation copying the tracks 8, 9, 10, 11 from volume B to tracks 20, 21, 22, and 23 in Volume C. In response the storage controller 8 creates a source bit map 70 for volume B and a target bit map 80 for Volume C. Source 74 and target 84 relationship tables would also be generated showing the copy operation between source B and target C. The sequence number in the source 74 and target 86 relationship tables in the second point-in-time copy operation is incremented to two, indicating that the second set of relationship tables 74 and 84 were created after the first set 54, 64.

In further embodiments, when establishing the relationship tables, the storage controller 8 would inspect tables for intersections, such as two source-target pairs addressing the same physical location. For instance, the storage controller 8 would detect that the source relationship table 74 of Volume B is addressing physical tracks 8, 9, 10, 11 that are addressed by the target relationship table 64 for volume B. The storage controller 8 would then determine that the target bit map 60 for volume B shows that the content of tracks 8, 9, 10, and 11 is located on source tracks 0, 1, 2, 3. Upon detecting that the content of source tracks is located at other source tracks, the storage controller 8 would modify the relationship tables to have the target for volume C point to the ultimate source of volume A. This is accomplished by removing intervening source relationship table 74, and modifying the target relationship table 84 to the values at 86 indicating that the source device is A and the source start 0 and end 3 are tracks 0 and 3 on volume A. Further, the storage controller 8 would add a second extent pair of relationship information 56 to the source relationship table 54 indicating that source A is also the source of target C. This extent pair information 56 would have the second sequence number reflecting the time sequence when the relationship between target C and source A was created. Thus, the relationship table for volume A has two pairs of source data for targets in Volumes B and C.

In this way, intermediate levels of pointers, i.e., the pointers in relationship table 74 that pointed to volume A, are removed so the target addresses the data at the source location that physically stores the data, which in FIG. 3b is source A including protected tracks 0, 1, 2, 3.

Creating Point-In-Time Copies

Figure 4A:
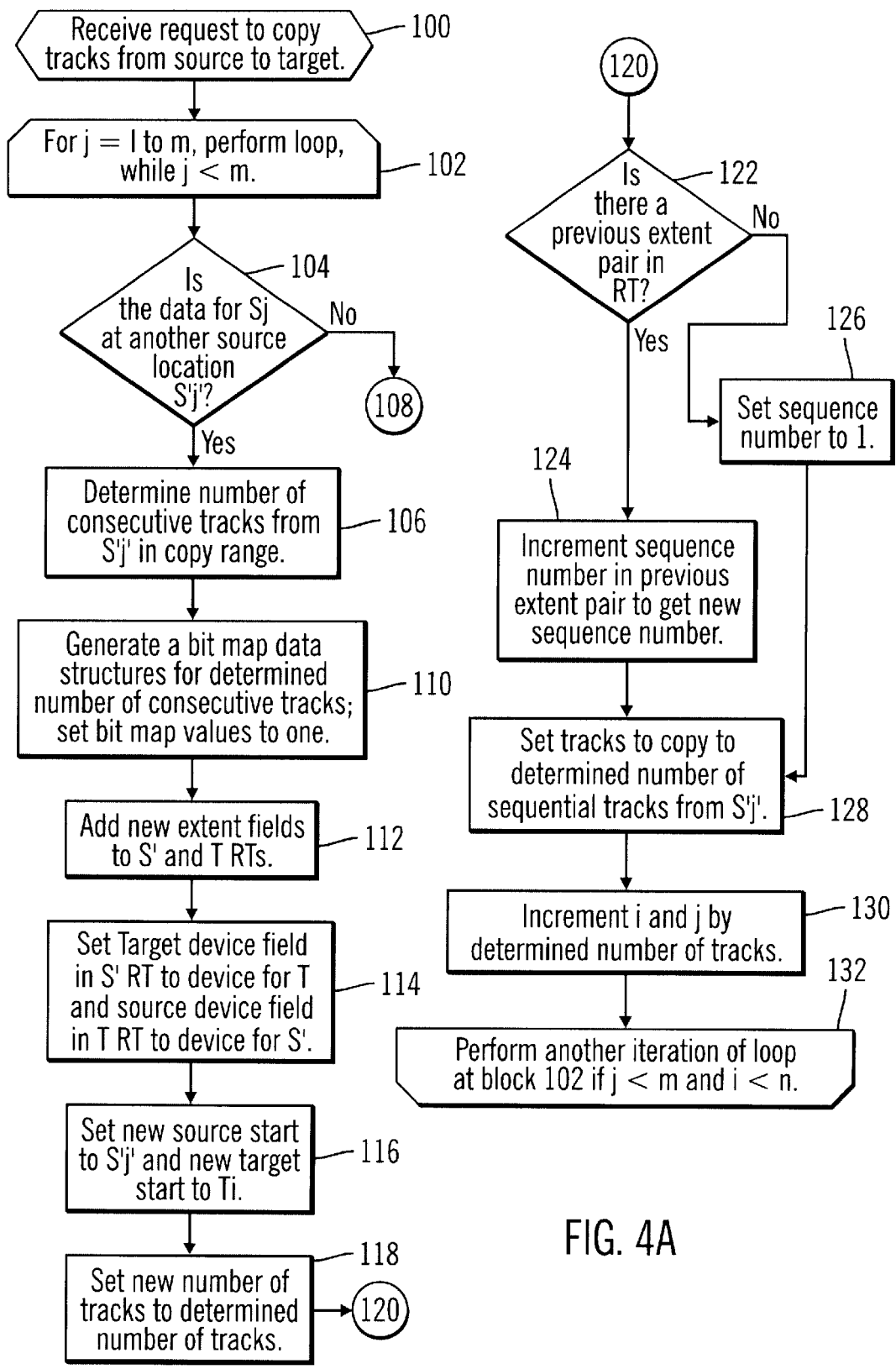
FIGS. 4a, b illustrate logic to create a point-in-time copy of data in accordance with preferred embodiments of the present invention.
Figure 4B:
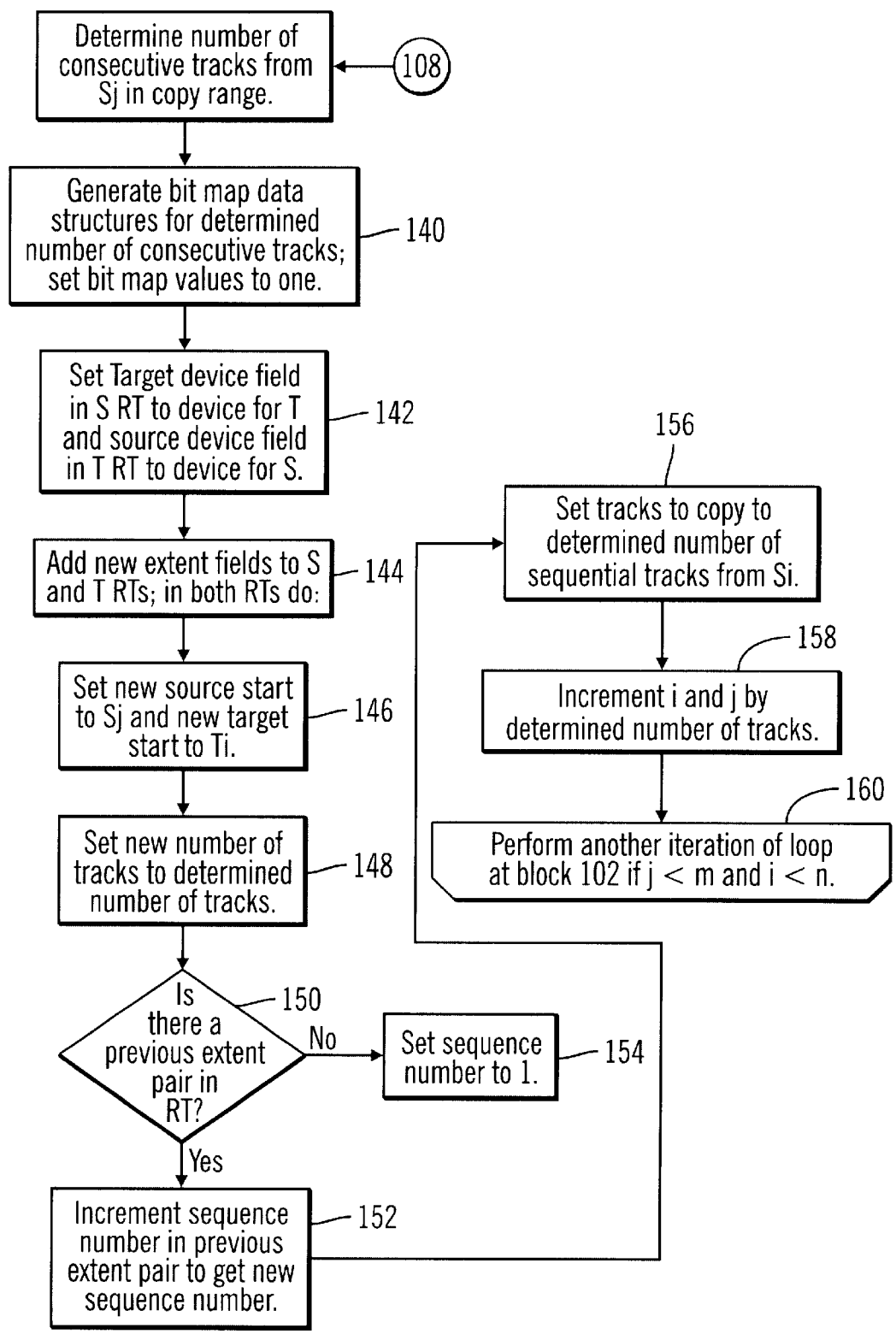

FIGS. 4a and 4b illustrate logic implemented in the storage controller 8 to create a point-in-time copy of tracks in a copy range. The host 4 would send the storage controller 8 a request including a range of source tracks $S_j$, where j=1 to m, to copy to a range of target tracks $T_i$, where i=k to n. The point-in-time copy operation begins (at block 100) when the storage controller 8 receives the copy command from the host 4.

The storage controller 8 begins a loop (at block 102) to perform from j=1 to m and i=k to n, while j<m and i<n. This loop is executed to fill in the extent field information in the source relationship table (S RT) and the target relationship table (T RT). The loop begins with the storage controller 8 determining (at block 106) whether the data for $S_j$ is at another source location, $S'_j$, such that the source track $S_j$ is the target track for the source track $S'_j$. The situation where the source track $S_j$ is itself a target of another source track $S'_j$, would occur if there was a previous point-in-time copy operation where $S_j$ was the target of such copy operation and the bit map data structure and relationship table for $S_j$ indicates that the data for $S_j$ is at the source track $S'_j$. If the data for $S_j$ is at another location $S'_j$, then the storage controller 8 begins operations (at block 106) to add an extent pair to the target relationship table (T-RT) and the alternative source S' relationship table (S'-RT) to indicate the location of an extent of consecutive data involved in the point-in-time copy operation.

The storage controller 8 determines (at block 106) the number of consecutive tracks from track $S'_j$, in the point-in-time copy range. The storage controller 8 then generates (at block 110) bit map data structures for each of the determined consecutive tracks in the copy operation and sets each of the bit map values, corresponding to the determined consecutive tracks, to one. If there is a preexisting alternative source S' and/or target T bit map structure having a value for any of the determined consecutive tracks, then such value is set to one. Otherwise, bit map values are added to an existing data structure, or a new data structure is created, for those consecutive tracks not having a corresponding bit map value.

To set values in fields in the source S' and target T relationship tables, the storage controller 8 would add (at block 112) a set of fields 24–34 for a new extent pair in the S' and T relationship tables. If there was no such pre-existing relationship table, then the storage controller 8 would build one. The storage controller 8 would then perform the steps at blocks 114–130 to set the values in the fields for the new extent pair in the target and source S' relationship tables.

The storage controller 8 would set (at block 114) the target device address 24 in the source S' relationship table to the address of the target T device and the source device address 24 in the target relationship table to the address of the source S' device. The storage controller 8 would further set the source start 26 field to $S'_j$, and the new target start field 32 to $T_i$. The number of tracks field 30 would be set (at block 118) to the determined number of consecutive tracks, determined at block 108. The storage controller 8 would then determine, for both the source S' relationship table and the target relationship table, whether there is a previous extent pair in the relationship table. If so, the storage controller 8 increments (at block 124) the sequence number 38 in the preceding extent of the source S' and/or target relationship tables by one to obtain the sequence number 38 for the new extent pair. Otherwise, the storage controller 8 sets (at block 126) the sequence number 38 for the source S' and/or target relationship tables in the new extent pair to one. After setting the sequence number fields 38 in the source S' and target relationship tables (from blocks 124 or 126), the storage controller 8 sets (at block 128) the tracks to copy field 36 in the source S' and target relationship tables to the determined number of sequential tracks from $S'_j$.

After setting the relationship table values for the extent pair for the consecutive number of tracks from S' that are in the copy range, the storage controller 8 would increment the values of i and j by the determined number of consecutive tracks as relationship table values have already been created for those consecutive tracks in the copy range. After incrementing i and j, the storage controller 8 performs another iteration of the loop at block 102 if j<m and i<n, i.e., all the tracks in the copy range have not been considered and specified in relationship tables.

If the storage controller 8 determined (at block 104) that the data for $S_j$ is at the source track specified in the copy operation, and not at another location S', then the storage controller 8 proceeds to perform blocks 108, 140, 142, 144, 146, 148, 150, 152, 154, 156, 158, 160 to set-up bit map data structures and relationship table extent fields for the source S and target T tracks specified in the copy operation. The steps performed at blocks 108, 140, 142, 144, 146, 148, 150, 152, 154, 156, 158, and 160 are the same operations performed at blocks 106, 110, 112, 114, 116, 118, 120, 122, 124, 126, 128, 130, and 132, respectively, except that the operations are performed with respect to the source track S, and not the alternative source location S'.

With the logic of FIGS. 4a, b, the storage controller 8 creates the relationship table for a particular volume or storage location to indicate point-in-time copy data to copy from a source to a target location. The bit map data structures associated with the extent pairs in the relationship tables indicate the location of the point-in-time copy data, i.e., at the source or target storage location. The source and target storage locations for which relationship tables are maintained may be different logical volumes on the same DASD 8 or different sections within the same logical volume. Alternatively, the source S, alternative source S', and target T locations may be located on the same device or logical volume or on separate devices or logical volumes. The logical volumes of the source S, alternative source S', and target T locations may be within a single DASD 6 or in different DASD 6 at different geographical locations.

The storage controller 8 may create and maintain the bit map and relationship table data structures in the NVS 12. In this way, if the system fails, then the location of point-in-time copies of data may be recovered from the NVS 12.

After building the relationship tables and bit map data structures, the storage controller 8 may begin a copy operation to copy the data from the source S and/or alternative source S' storage locations to the target T locations. Alternatively, the point-in-time copy data need not be copied from the source to target. In this way, with the logic of FIGS. 4a, b, the location of the point-in-time data, i.e., data at a particular moment in time, is identified by the combination of the relationship tables and bit map data structures indicating whether the data is at the source or target location.

In preferred embodiments, when a relationship is established by setting the field values in the relationship table, any data for the target tracks subject to the point-in-time copy relationship that are maintained in cache 10 may be discarded. Further, if any of the source tracks have data in cache 10, then such data may be destaged from cache 10 to DASD 6. In this way, all the source tracks in the DASD 6 are current as of the point-in-time operation.

Figure 5:
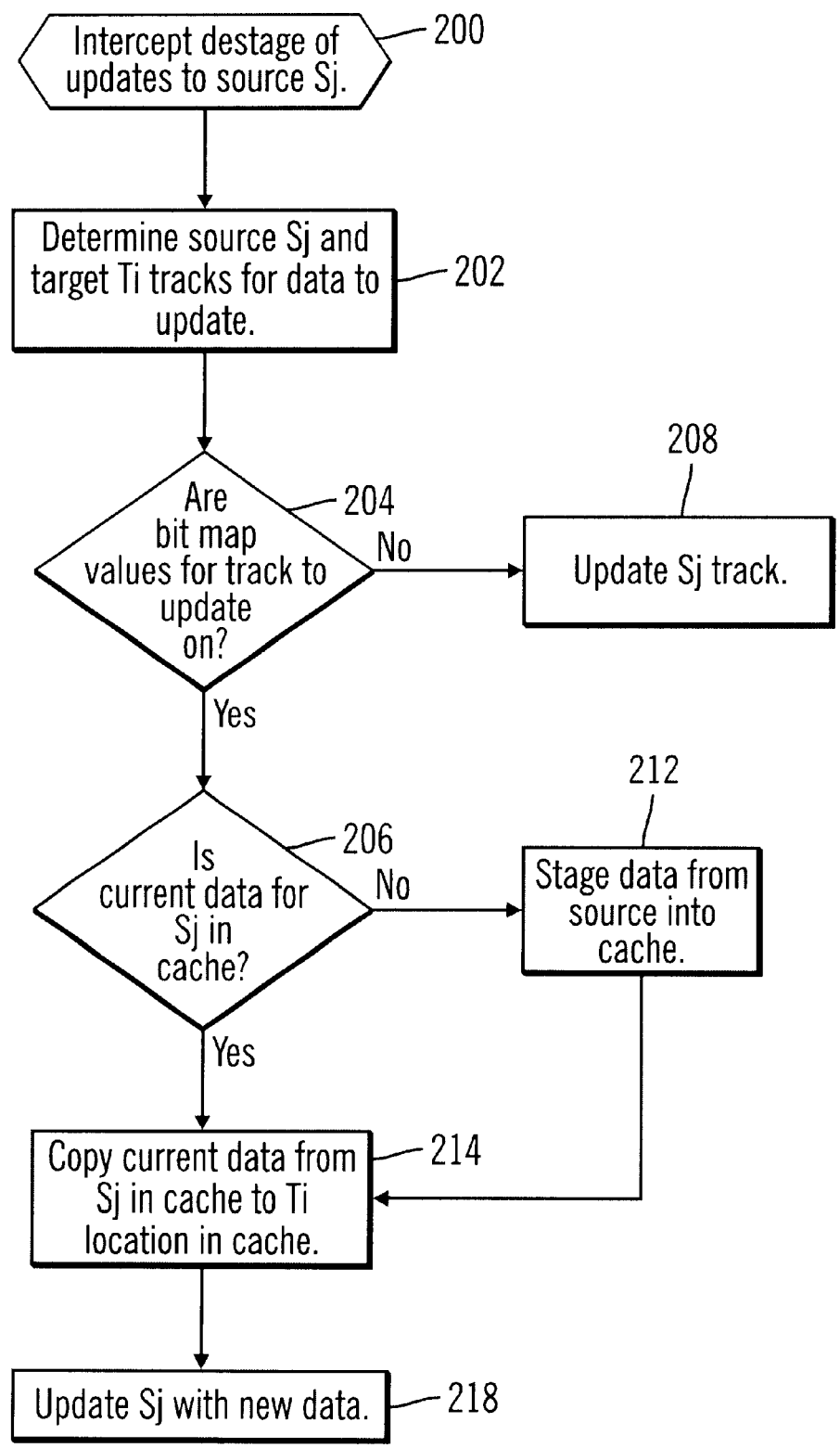
FIG. 5 illustrates logic to update point-in-time data at the source location in accordance with preferred embodiments of the present invention.

FIG. 5 illustrates logic implemented in the storage controller 8 to handle a destage operation to update source track $S_j$ that is subject to a previously established point-in-time copy operation. In preferred embodiments, updates to tracks are maintained in cache 10 until an algorithm, such as a least recently used algorithm (LRU), determines to destage data from cache 10. Thus, an update is written to the source track location in cache 10 and is not written to the DASD 6 until the destage operation. For instance, if the storage controller 8 is operating in a DASD fast write (DFW) mode, then the storage controller 8 would store updates to the data in cache 10 and NVS 12, and destage updated data to DASD 6 at some later time. The logic begins at block 200 when the storage controller 8 intercepts a destage operation to write updates to a track that is subject to an existing point-in-time copy operation, i.e., the track to update is represented in a point-in-time source and target bit map and relationship table. The storage controller 8 determines (at block 202) the source Si and target $T_i$ tracks for the track to update. The storage controller 8 then determines (at block 204) whether the source and target bit map values for the track to update are "on," indicating that the track has not been copied from the source to the target. If so, control transfers to block 206; otherwise, the storage controller 8 updates (at block 208) the track at the source $S_j$.

If the source and target bit map values for the track to update are on, then the current data needs to be written to the target track before the point-in-time copy of the data is updated. To update data at the source when the bit map values are on, the storage controller 8 determines (at block 206) whether the current data for $S_j$ is in cache 10. If so, control transfers to block 214; otherwise, the storage controller 8 stages (at block 212) the current data at the source $S_j$ location from DASD 6 into the corresponding source $S_j$ location in cache 10. After a copy of the current data to update is in cache 10 (from the yes branch of block 206 or block 212), the storage controller 8 copies (at block 214) the current data from the source track $S_j$ in cache 10 to the target track $T_i$ location in cache 10. In preferred embodiments, the current data in cache 10 will not be copied to the target track $T_i$ in DASD 6 until the execution of a destage operation with respect to such track in cache 10. The update in cache 10 may then be applied (at block 218) to the source track $S_j$ in DASD 6.

After destaging the current data, or the copy of the current data in the source track $S_j$ when the point-in-time copy relationship was established, in cache 10 to the target location $T_i$ in DASD 6, the storage controller 8 turns off the bit values in the source and target bit map structures corresponding to the source $S_j$ and target $T_i$ tracks, respectively. The storage controller 8 further (at block 216) decrements the tracks to copy value 36 in both the target and source relationship tables to indicate one less track to copy from the source to target.

The logic of FIG. 5 insures that before updates overwrite the point-in-time data at the source, the point-in-time data is copied to the target location and preserved. In embodiments where data is stored in a CKD data format, a copy operation from the source to target tracks comprises copying the source tracks to the target tracks, and modifying the CKD information in the tracks copied to the target location to reflect the CCHH location of the target tracks.

Figure 6:
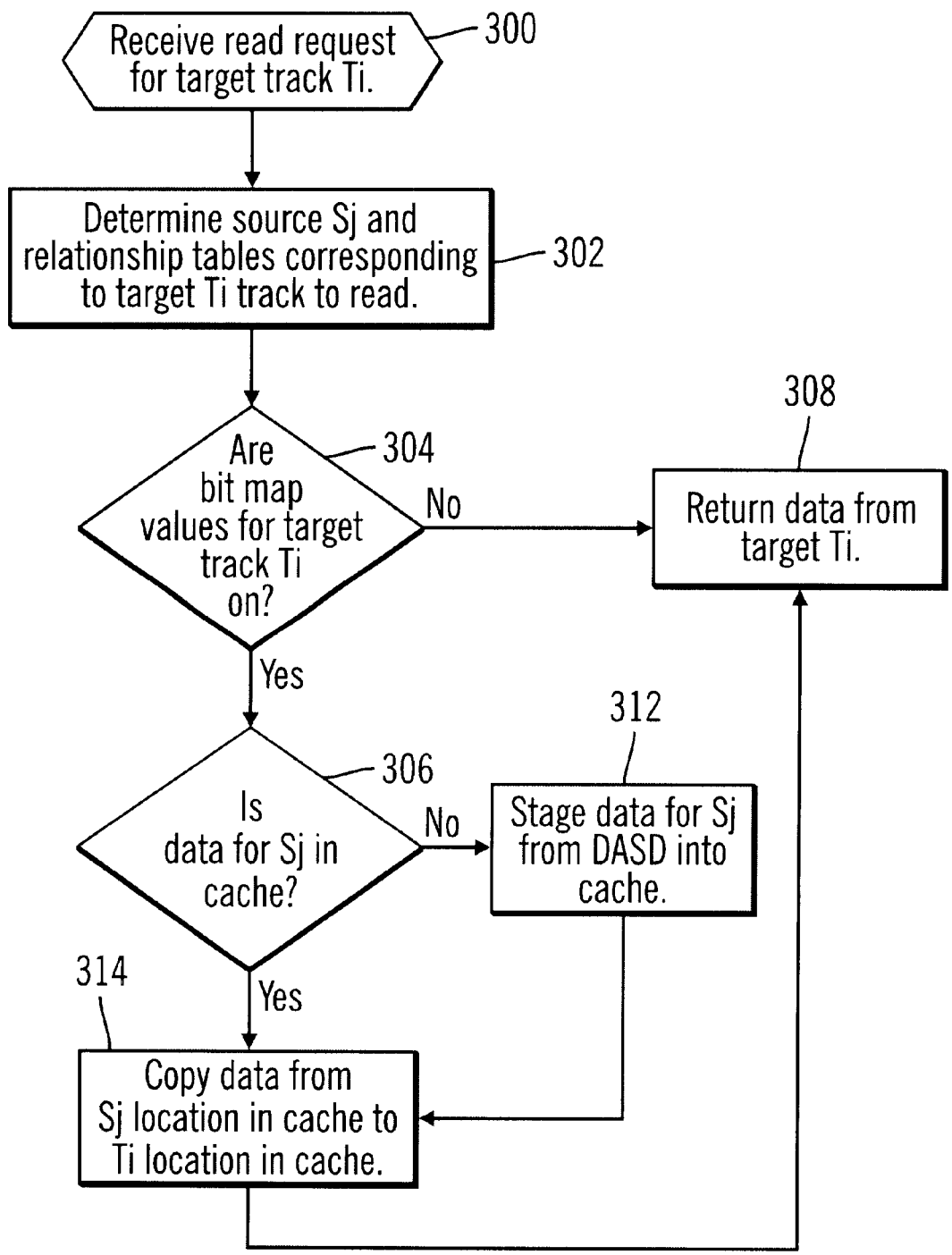
FIG. 6 illustrates logic to read point-in-time data in accordance with preferred embodiments of the present invention.

FIG. 6 illustrates logic implemented in the storage controller 8 to handle a read request for data from a location that is a target in a point-in-time copy operation. such a request for data at a $T_i$ target would be for the data that existed when the point-in-time relationship was established. Control begins at block 300 with the storage controller 8 receiving a request for data from a target track $T_i$ that is the target in a point-in-time extent pair. The storage controller 8 determines (at block 302) the source $S_j$ and target relationship tables and bit map data structures corresponding to the target track $T_i$. The storage controller 8 then determines (at block 304) whether the bit map values in the bit maps for the source and target corresponding to $T_i$ are "on," i.e., whether the point-in-time copy of the data is maintained at the source $S_j$ track. If so, control transfers to block 306; otherwise, control transfers to block 308 where the storage controller 8 returns the requested data from the target track $T_i$. If the data is maintained at the source location $S_j$, then the storage controller 8 determines (at block 306) whether the data for $S_j$ is in cache 10. If so, the storage controller copies (at block 314) the requested data from the source location $S_j$ in cache 10 to the target track $T_i$ location in cache 10. During destaging operations, the data at the cache 10 location corresponding to the target track $T_i$ is destaged to the target location in the DASD 6. If the bit map values for the target track $T_i$ are not "on," then the data is in the target $T_i$ location in cache 10 or the DASD 6. In either case (from the no branch of block 304 or 314), the storage controller 8 then returns the requested data from the target track $T_i$ location in cache 10 at block 308 (at block 308). If the requested target $T_i$ data is not in cache 10, then the storage controller 8 stages the $T_i$ data into cache 10 from where it is maintained in the DASD 6, i.e., the source or target location, and then returns the data from cache 10.

After destaging the data from the target track $T_i$ location in cache 10 to the $T_i$ location in DASD 6, the storage controller 8 sets the bit map values in the bit map data structures corresponding to the $S_j$ and $T_i$ tracks to off, indicating that the point-in-time data is at the target location. The storage controller 8 further decrements the tracks to copy value 36 in both the target and source relationship tables to indicate on less track to copy from the source to target.

With the logic of FIG. 6, the storage controller 8 insures that the point-in-time copy of the data is provided at the target track location in cache 10 when the host 4 wants to read the point-in-time data.

Figure 7:
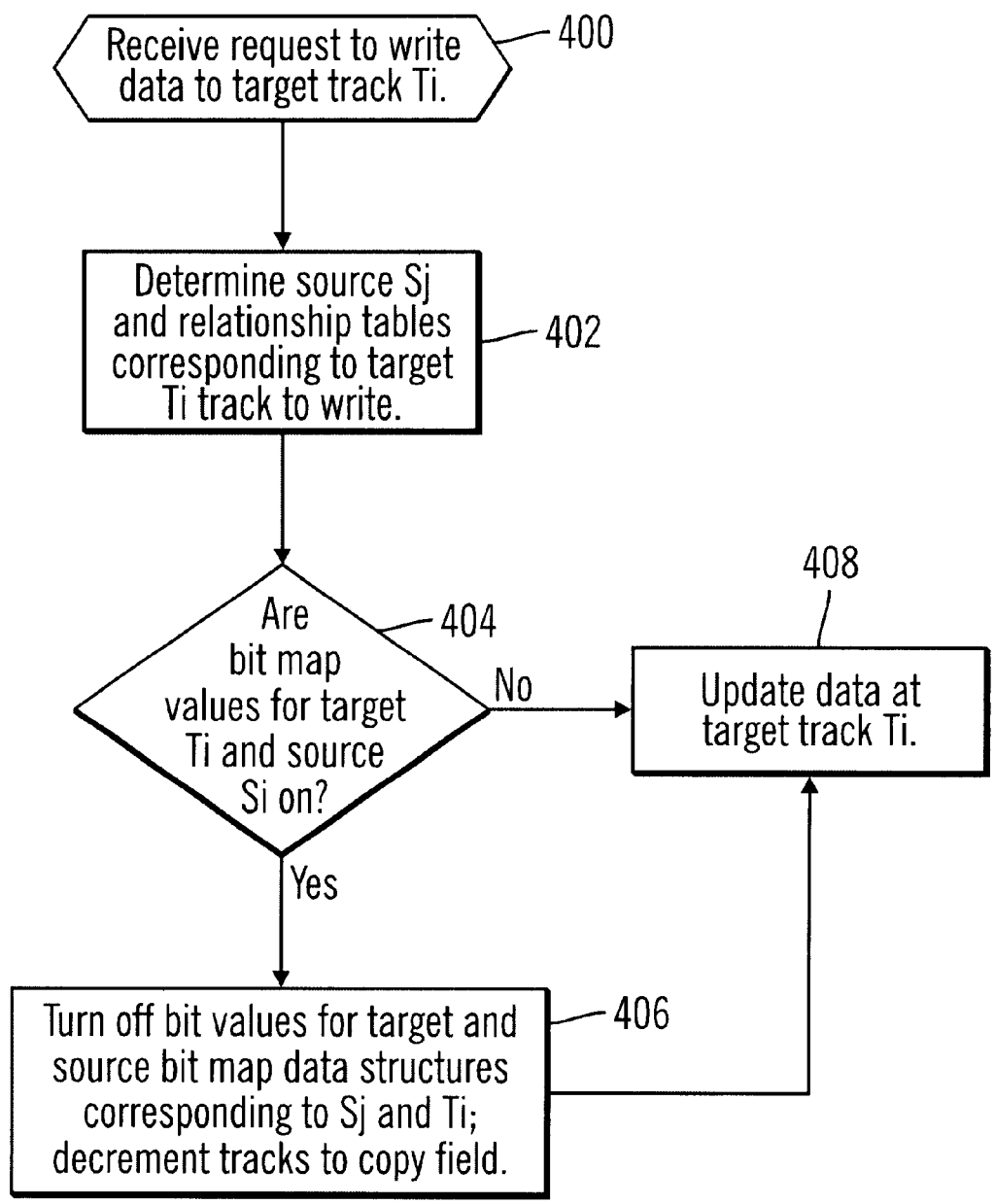
FIG. 7 illustrates logic to update point-in-time data at the target location in accordance with preferred embodiments of the present invention.

FIG. 7 illustrates logic when the host 4 attempts to update a point-in-time target track $T_i$, such as the case if the host 4 is operating on the point-in-time data as part of a test or other operation. Control begins at block 400 where the storage controller 8 receives a data update to target track $T_i$ from the host 4. The storage controller 8 processes (at block 402) the relationship table for the target track $T_i$ to update to determine the corresponding source track $S_j$ and source relationship table. The storage controller 8 then determines (at block 404) whether the bit map data structures for the target $T_i$ and corresponding source track $S_j$ are "on," i.e., whether the point-in-time copy is at the source track $S_j$ storage location. If so, the storage controller 8 (at block 406) sets the bit map values for the source $S_j$ and target $T_i$ to off. The storage controller 8 further (at block 406) decrements the tracks to copy value 36 in both the target and source relationship tables to indicate one less track to copy from the source to target. From block 406 or the no branch of block 404, the storage controller 8 updates (at block 408) the data at target track $T_i$ with the update data from the host 4. After the target track is updated, the data no longer needs to be copied from the source to target location as the host 4 has modified the point-in-time data.

When applying an update from cache 10 to the corresponding location in the DASD 6, if the update is to the entire track, then the track in cache 10 is copied to the corresponding location in the DASD 6. However, if the update in cache 10 is for a portion of a track, e.g., records on a track, then the track to update is first staged into cache 10 and the update is then applied to the track in cache 10. The updated track in cache 10 is then copied to DASD 6.

In certain embodiments, the storage controller 8 may perform background copy operations to move the data from the source tracks to the target tracks. Upon copying the data from a source to target track, the storage controller 8 would set the bit map value for the source and target tracks to "off," and decrement the tracks to copy field 36. Alternatively, with preferred embodiments, the storage controller 8 may not copy the point-in-time data from the source to target, and instead leave the point-in-time data on the source track location until the host 4 performs a data access operation, i.e., read or write, with respect to the source or target location. In such case, the storage controller 8 would copy the data from the source to target according to the logic of FIGS. 5, 6, and 7. Preferred embodiments thus reduce burdens on processor cycles over methods that make a physical copy of the data because the storage controller 8 does not have to transfer the point-in-time data between the source and target. Instead, with the preferred embodiments, the relationship tables indicate the location of the point-in-time data and data is only copied in the case of an update to a source track or read to a target track, which necessitates a copy operation to preserve the point-in-time data. The use of the preferred bit map data structures and relationship tables, thus, obviates the need to copy the data from the source to the target.

In further embodiments, if a bit map data structure contains all zero values, then the storage controller 8 may erase the target and source bit map data structure and the extent pairs in the relationship tables which maintained information on the point-in-time data as the point-in-time data represented by the relationship table and bit map data structures is entirely copied to the target locations and not maintained at both the source and target locations.

Figure 8A:
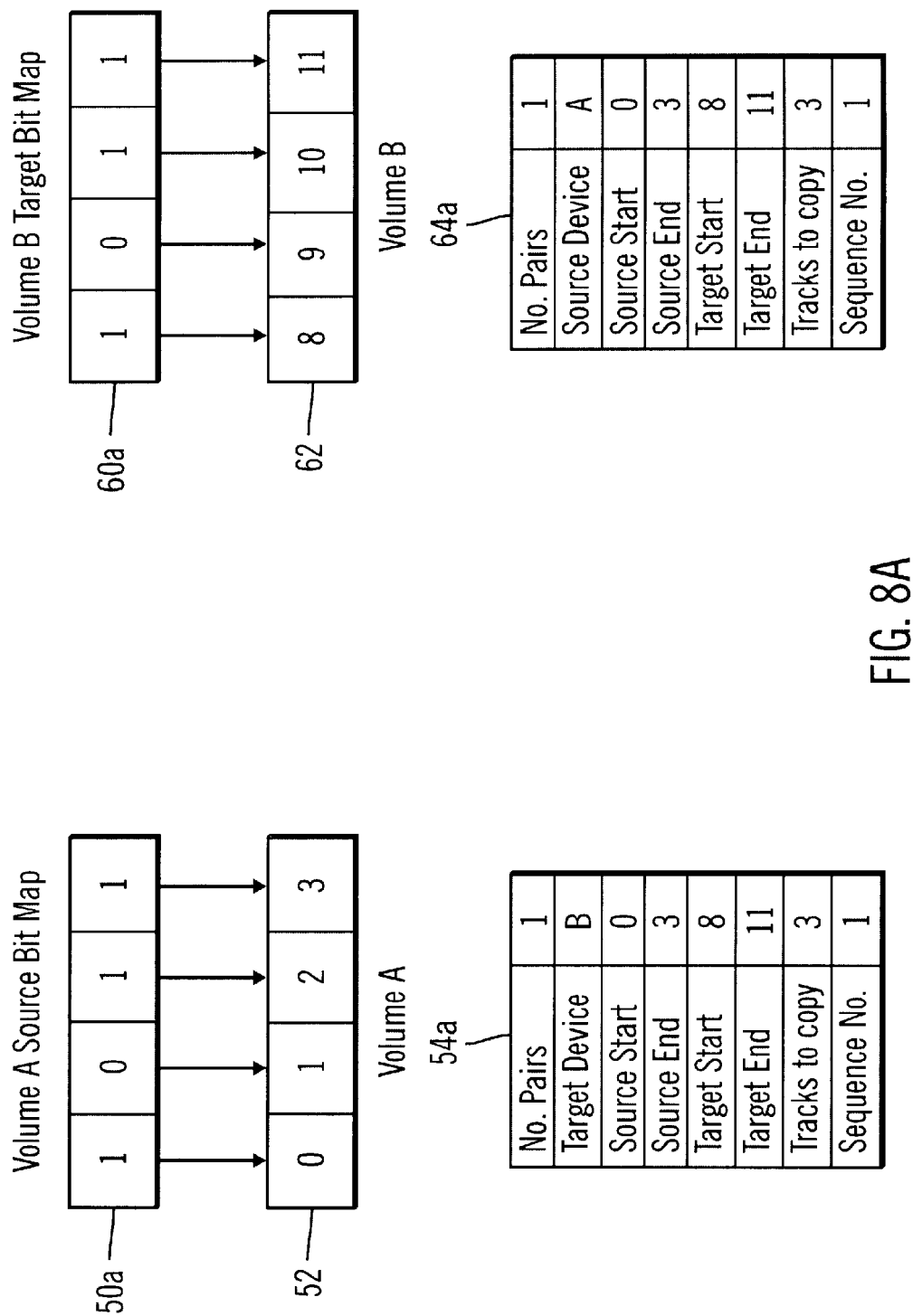
FIGS. 8a, b, c illustrate examples of point-in-time copy operations and updates to point-in-time data in accordance with preferred embodiments of the present invention.

FIGS. 8a, b, c illustrate bit map and relationship table data structures established during point-in-time copy operations. FIG. 3a illustrates the establishment of a point-in-time copy relationship between tracks from volumes A and B, and the relationship table when the host 4 requests a point-in-time copy from source tracks 0, 1, 2, 3 to target tracks 8, 9, 10, and 11. If an update occurs to source track 1, then according to the logic of FIG. 5, the current data in source track 1 would be written to corresponding target track 9 and the bit map values corresponding to source track 1 and target track 9 would be set to 0, indicating that the point-in-time data is maintained in target track 9. The result of updating source track 1 is shown in FIG. 8a. In FIG. 8a, the bit map values for source track 1 and target track 9 in bit maps 50a and 60a are set to 0 and the tracks to copy field in the source 54a and target 64a relationship tables are decreased by one, to three tracks left to copy.

Figure 8B:
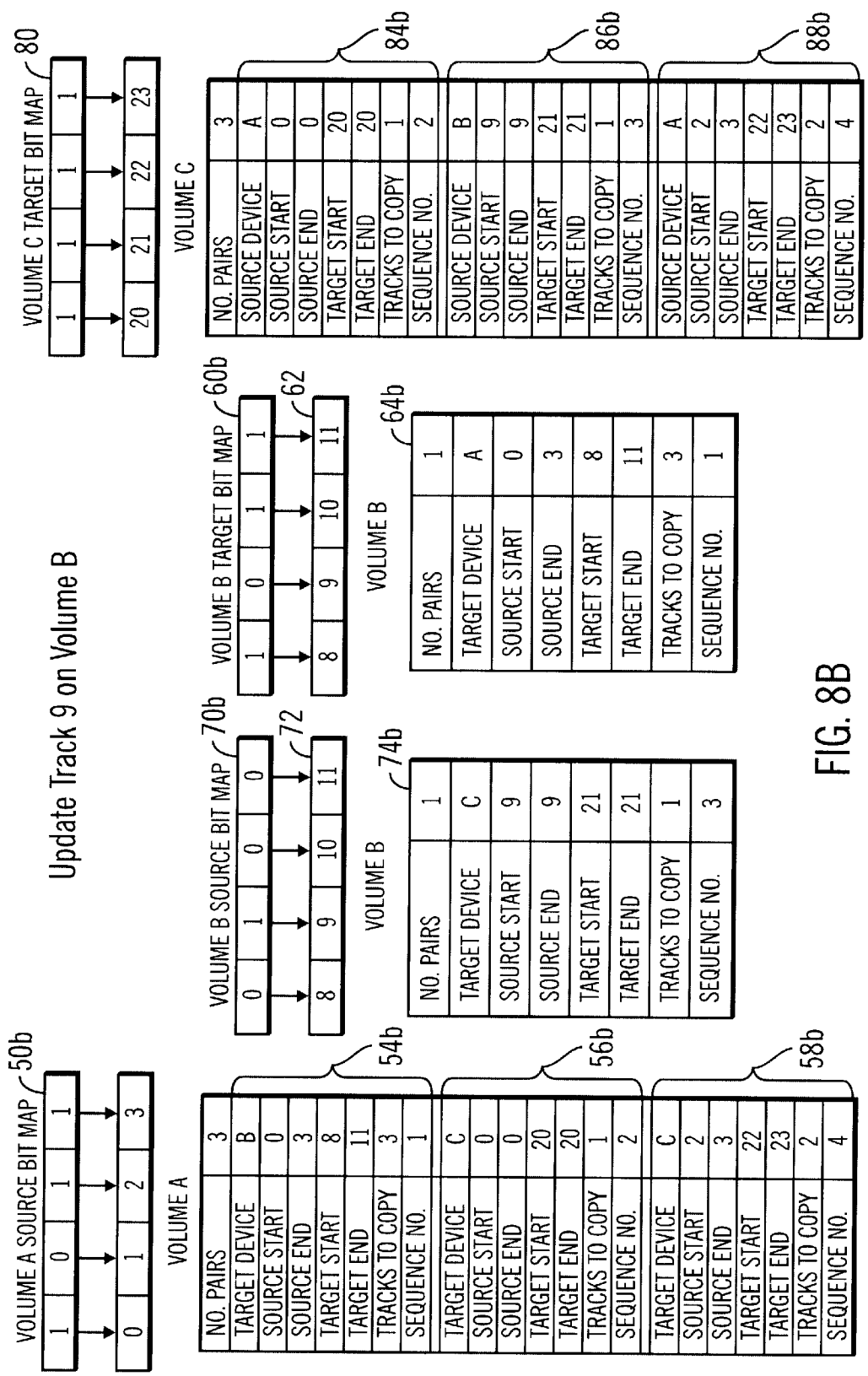

FIG. 8b illustrates alterations to the bit maps and relationship tables if, after the write operation to track 9, a point-in-time copy is made between source tracks 8, 9, 10, and 11 and target tracks 20, 21, 22, and 23 in volume C, also shown in FIG. 3b. At this point, tracks 8, 9, 10, and 11 are both source and target tracks of different point-in-time copy operations. Target tracks 20, 21, 22, and 23 have as source tracks track 0 in volume A, track 9 in volume B, and tracks 2 and 3 in volume A. Because the source tracks for the target tracks 20, 21, 22, and 23 are split into three extents of consecutive tracks, there are three extent pairs created for the point-in-time copy to volume C, or extents 84b, 86b, and 88b. For each of the three target extents 84b, 86b, and 88b for volume C, there are corresponding source extents in volume A 56b, in volume B 74b, and in volume A 58b, respectively. A single extent pair is maintained for the first point-in-time copy between volumes A and B of extent pairs 54b and 64b. The sequence numbers in the extent pairs reflect when the extent pair was added to the relationship table. The first extent pair added for the second point-in-time copy between volumes B and C, having a sequence number of 2, are extent pair 56b and 84b, for the first target track 20 in the operation. The second extent pair for the next consecutive extent or track 20 in the copy operation, track 21, comprises extent pair 74b and 86b, which both have sequence number of 3. The third extent pair for the next extent of consecutive tracks 20 and 21 comprises extent pair 58b and 88b, having sequence number 4.

Figure 8C:
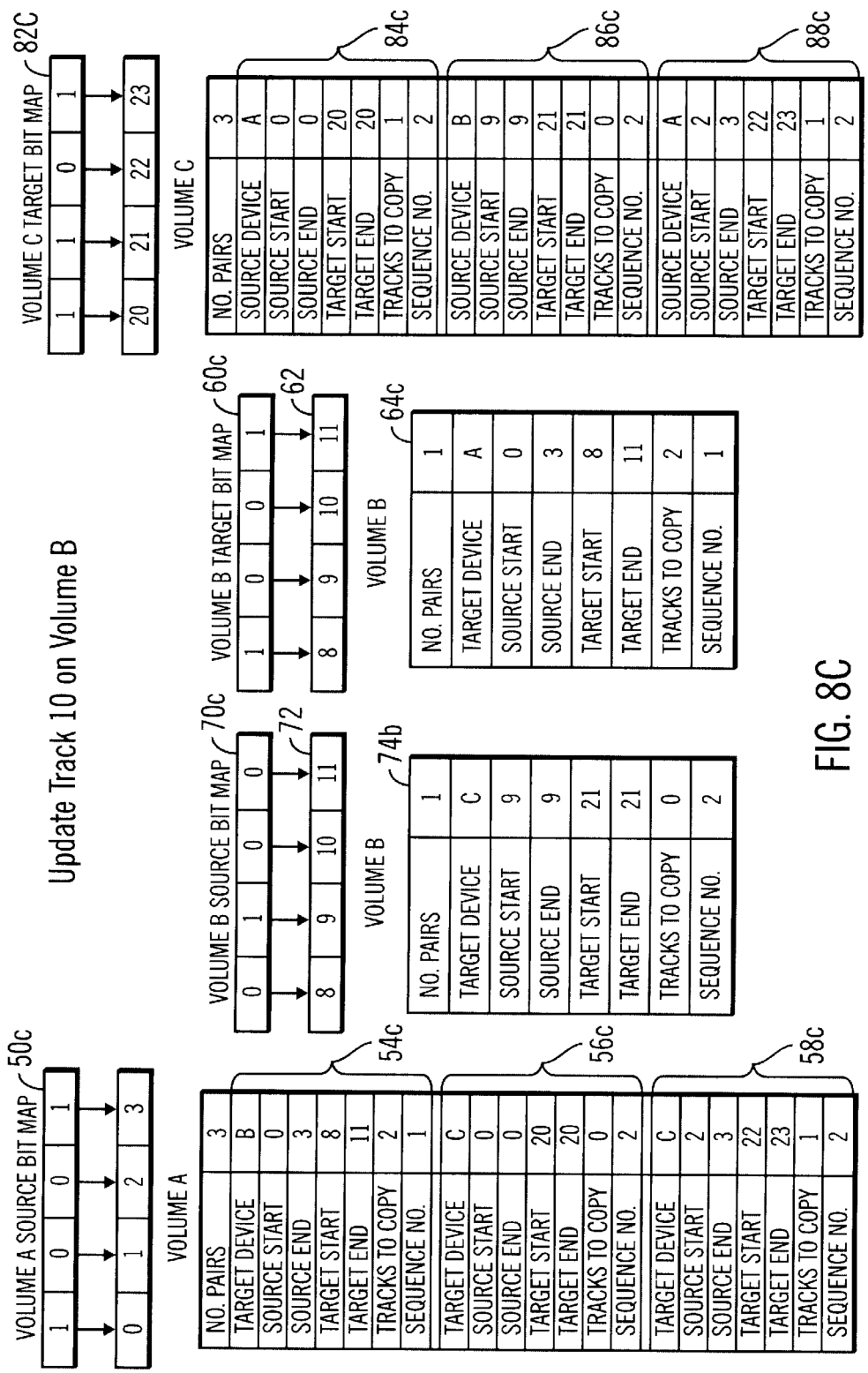

FIG. 8c illustrates modifications to the relationship tables and bit map data structures after an update to target track 10 in Volume B. An update to track 10 would, according to the logic of FIG. 7, set the bit map values for the target and source bit maps to 0, as shown in bit maps 50c and 60c. However, setting the bit map for track 2 to zero also affects the extent 58b, where track 2 is also the source for target track 22. Such an alternation of the bit map for the source track 2 would constitute an update to source track 2 and cause the storage controller 8 to write the data in track 2 to target track 22, and set the target bit map value in bit map 82c for the second point-in-time copy operation to 0, as the source bit map value was set to 0. This results in the relationship table and bit map values shown in FIG. 8c. As shown, the extent pair 58c and 88c reflect that source track 2 was copied to target track 22 as there is only one more track to copy, and the bit maps 50c and 82c for source track 2 and target track 22, respectively, are set to off. Extent pairs 54c and 64c also reflect the update to target track 10 as there is one less track to copy for this extent pair.

Preferred embodiments thus provide data structures, including relationship tables and bit maps, that are used to establish a copy of data from source to target locations at a point-in-time without having to physically copy the data from the source to target locations. Instead, relationship information is manipulated to indicate the location of the point-in-time data.

Conclusion

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described as performing point-in-time copy operations with respect to tracks of data. However, in alternative embodiments, the point-in-time copy operations of the preferred embodiments may apply to any type of storage unit representing a storage structure storing data.

Preferred embodiments were described with respect to separate bit map and relationship table data structures for source and target locations involved in a point-in-time copy operation. However, in alternative embodiments the information maintained in the described bit map or relationship table data structures may be maintained in a different data structure format than that described herein.

Preferred embodiments may be implemented in update-in place systems in which updates are written to the previous location of the updated data. In case of an update, the point-in-time data is copied to the target location to allow the update to proceed at the source location. Alternatively, the preferred embodiments may apply to a virtual storage location, such as an LSA virtual array, where a table maps logical storage locations to actual physical locations. In such case the source and target locations comprise virtual arrays or pointers to physical locations. At the time the point-in-time relationship is established, the source and target reference the same virtual array or pointers to the source point-in-time data. An update to the point-in-time data at the source would involve copying the update to a new location and modifying the source virtual array pointers to address the updated copy at the new location. Before applying the update, the point-in-time data would be copied to the target location addressed by the target virtual array pointers.

In preferred embodiments, data was not written to the target or source location from cache until a destage operation so as not to interfere with host access of the DASD 6. However, in alternative embodiments, whenever an update is received, the source data may be copied to the target location before updating the source location. Further reads to the target location could cause the transfer of the data to the target from the source before returning the requested data.

In summary, preferred embodiments disclose a method, system, program, and data structures for maintaining electronic data at a point-in-time. A first data structure indicates point-in-time data at one of a first storage location and a corresponding second storage location. A second data structure indicates point-in-time data at one of a first storage location and corresponding second storage location. A first relationship data structure indicates a relationship between the first storage location and corresponding second storage location and a second relationship data structure indicates a relationship between the first storage location and second storage location. A request to process the first storage location is processed by processing the first relationship data structure to determine the corresponding second storage location for the first storage location and processing the first data structure to determine whether data at the first storage location was transferred to the second storage location. A request to process the second storage location is processed by processing the second relationship data structure to determine the corresponding first storage location for the second storage location and processing the second data structure to determine whether the point-in-time data at the first storage location was transferred to the second storage location.

The foregoing description of the preferred embodiments of the; invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for maintaining electronic data at a point-in-time, comprising:

generating a first data structure indicating point-in-time data at one of a first storage location and a corresponding second storage location, wherein the first and second storage locations comprise physical storage locations on a storage medium;

generating a second data structure indicating point-in-time data at one of a first storage location and corresponding second storage location;

generating a first relationship data structure indicating a relationship between the first storage location and corresponding second storage location;

generating a second relationship data structure indicating a relationship between the first storage location and second storage location;

processing a request with respect to the first storage location by processing the first relationship data structure to determine the corresponding second storage location for the first storage location and processing the first data structure to determine whether data at the first storage location was transferred to the second storage location; and processing a request with respect to the second storage location by processing the second relationship data structure to determine the corresponding first storage location for the second storage location and processing the second data structure to determine whether the point-in-time data at the first storage location was transferred to the second storage location.

2. The method of claim 1, wherein the data at the point-in-time comprises multiple storage units of data, wherein the first and second data structures indicate whether each storage unit of point-in-time data is located at one of the first and corresponding second storage locations.

3. The method of claim 1, wherein the first and second relationship data structures each indicate a range of first storage locations for storing the point-in-time data and a corresponding range of second storage location for storing the point-in-time data.

4. The method of claim 3, wherein the first and second data structures and relationship data structures are established at a first point-in-time, further comprising establishing at a second point-in-time a third relationship data structure indicating a range of third storage locations corresponding to the second storage location, wherein the second point-in-time data is maintained at one of the third storage location and corresponding second storage location.

5. The method of claim 1, wherein the first and second data structures and relationship data structures are created in response to a request to copy point-in-time data from the first storage location to the second storage location.

6. The method of claim 5, further comprising copying the point-in-time data from the first storage location to the second storage location.

7. The method of claim 6, further comprising modifying the first and second data structures to indicate that point-in-time data copied from the first storage location to the second storage location is not located at the first storage location and is located at the second storage location.

8. The method of claim 1, further comprising:
receiving an update to point-in-time data;
processing the first data structure to determine whether the point-in-time data to update is at the first storage location;
copying the point-in-time data to update from the first storage location to the corresponding second storage location after determining that the point-in-time data to update is at the first storage location;
modifying the first and second data structures to indicate that the point-in-time data to update is at the second storage location; and
updating the point-in-time data at the first storage location.

9. The method of claim 8, wherein each storage location comprises corresponding locations in a cache and a storage device, wherein copying the point-in-time data from the first storage location to the corresponding second storage location comprises:
copying the data to the second storage location in cache;
destaging the data at the second storage location in cache to the corresponding location in the storage device, wherein modifying the first and second data structures occurs after destaging the data from the second storage location in cache to the corresponding location in the second storage device.

10. The method of claim 8, wherein the first storage location comprises a first logical storage location addressing first physical storage locations including the point-in-time data and the second storage locations comprises a second logical storage location addressing second storage locations, wherein copying the point-in-time data to update comprises copying the data to the corresponding second storage location addressed by the second logical storage locations, and wherein updating the point-in-time data at the source storage location comprises copying the point-in-time data to a new physical location and modifying the first logical storage location addressing the point-in-time data to address the new physical location including the updated point-in-time data.

11. The method of claim 1, further comprising:
receiving a request to read point-in-time data from the second storage location;
processing the first data structure to determine whether the requested point-in-time data is at the first storage location;
copying the requested point-in-time data from the first storage location to the corresponding second storage location after determining that the requested point-in-time data is at the first storage location;
modifying the first and second data structures to indicate that the requested point-in-time data update is at the second storage location; and
returning the requested point-in-time data from the second storage location.

12. The method of claim 11, wherein each storage location comprises corresponding locations in a cache and a storage device, wherein copying the point-in-time data from the first storage location to the corresponding second storage location comprises:
copying the data to the second storage location in cache;
destaging the data: at the second storage location in cache to the corresponding location in the second storage device, wherein modifying the first and second data structures occurs after destaging the data from the second storage location in cache to the corresponding second storage location in the storage device, and wherein the requested point-in-time data is returned from the second storage location in cache.

13. The method of claim 1, further comprising:
receiving a request to update point-in-time data at the second storage location;
updating the point-in-time data at the second storage location;
determining whether the first and second data structures indicate that the point-in-time data to update is at the first storage location; and
modifying the first and second data structures to indicate that the point-in-time data to update is at the second storage location after determining that the first and second data structures indicate that the point-in-time data to update is at the first storage location.

14. A system for maintaining electronic data at a point in time, comprising:
a processing unit;
a storage medium;
storage locations accessible to the processing unit, wherein the storage locations comprise physical storage locations on the storage medium; and
program logic executed by the processing unit, comprising:
(i) means for generating a first data structure indicating point-in-time data at one of a first storage location and a corresponding second storage location;
(ii) means for generating a second data structure indicating point-in-time data at one of a first storage location and corresponding second storage location;
(iii) means for generating a first relationship data structure indicating a relationship between the first storage location and corresponding second storage location;
(iv) means for generating a second relationship data structure indicating a relationship between the first storage location and second storage location;
(v) means for processing a request with respect to the first storage location by processing the first relationship data structure to determine the corresponding second storage location for the first storage location and processing the first data structure to determine whether data at the first storage location was transferred to the second storage location; and (vi) means for processing a request with respect to the second storage location by processing the second relationship data structure to determine the corresponding first storage location for the second storage location and processing the second data structure to determine whether the point-in-time data at the first storage location was transferred to the second storage location.

15. The system of claim 14, wherein the processing unit comprises a storage controller and wherein the storage locations are on a Direct Access Storage Device (DASD) and the point-in-time data comprises tracks.

16. The system of claim 14, wherein the data at the point-in-time comprises multiple storage units of data, wherein the first and second data structures indicate whether each storage unit of point-in-time data is located at one of the first and corresponding second storage locations.

17. The system of claim 14, wherein the first and second relationship data structures each indicate a range of first storage locations for storing the point-in-time data and a corresponding range of second storage location for storing the point-in-time data.

18. The system of claim 17, wherein the first and second data structures and relationship data structures are established at a first point-in-time, and wherein the program logic further comprises means for establishing at a second point-in-time a third relationship data structure indicating a range of third storage locations corresponding to the second storage location, wherein the second point-in-time data is maintained at one of the third storage location and corresponding second storage location.

19. The system of claim 14, wherein the program logic creates the first and second data structures in response to a request to copy point-in-time data from the first storage location to the second storage location.

20. The system of claim 19, wherein the program logic further comprises means for copying the point-in-time data from the first storage locations to the second storage location.

21. The system of claim 20, wherein the program logic further comprises modifying the first and second data structures to indicate that point-in-time data copied from the first storage location to the second storage location is not located at the first storage location and is located at the second storage location.

22. The system of claim 14, wherein the program logic further comprises:
means for receiving an update to point-in-time data;
means for processing the first data structure to determine whether the point-in-time data to update is at the first storage location;
means for copying the point-in-time data to update from the first storage location to the corresponding second storage location after determining that the point-in-time data to update is at the first storage location;
means for modifying the first and second data structures to indicate that the point-in-time data to update is at the second storage location; and
means for updating the point-in-time data at the first storage location.

23. The system of claim 22, further comprising:
a storage device;
a cache accessible to the processing unit, wherein each storage location comprise a corresponding location in the cache and the storage device, and wherein the program logic for copying the point-in-time data from the first storage location to the corresponding second storage location comprises:
copying the data to the second storage location in cache;
destaging the data at the second storage location in cache to the corresponding location in the storage device, wherein modifying the first and second data structures occurs after destaging the data from the second storage location in cache to the corresponding location in the second storage device.

24. The system of claim 22, wherein the first storage location comprises a first logical storage location addressing first physical storage locations including the point-in-time data and the second storage locations comprises a second logical storage location addressing second storage locations, wherein the program logic for copying the point-in-time data to update comprises means for copying the data to the corresponding second storage location addressed by the second logical storage locations, and wherein the program logic for updating the point-in-time data at the source storage location comprises means for copying the point-in-time data to a new physical location and means for modifying the first logical storage location addressing the point-in-time data to address the new physical location including the updated point-in-time data.

25. The system of claim 14, wherein the program logic further comprises:
means for receiving a request to read point-in-time data from the second storage location;
means for processing the first data structure to determine whether the requested point-in-time data is at the first storage location;
means for copying the requested point-in-time data from the first storage location to the corresponding second storage location after determining that the requested point-in-time data is at the first storage location;
means for modifying the first and second data structures to indicate that the requested point-in-time data update is at the second storage location; and
means for returning the requested point-in-time data from the second storage location.

26. The system of claim 14, further comprising:
a storage device;
a cache accessible to the processing unit, wherein each storage location comprise a corresponding location in the cache and the storage device, and wherein copying the point-in-time data from the first storage location to the corresponding second storage location comprises:
copying the data to the second storage location in cache;
destaging the data at the second storage location in cache to the corresponding location in the second storage device, wherein modifying the first and second data structures occurs after destaging the data from the second storage location in cache to the corresponding second storage location in the storage device, and wherein the requested point-in-time data is returned from the second storage location in cache.

27. The system of claim 14, wherein the program logic further comprises:
means for receiving a request to update point-in-time data at the second storage location;
means for updating the point-in-time data at the second storage location;

means for determining whether the first and second data structures indicate that the point-in-time data to update is at the first storage location; and means for indicating in the first and second data structures that the point-in-time data to update is at the second storage location after determining that the first and second data structures indicate that the point-in-time data to update is at the first storage location.

28. An article of manufacture for maintaining electronic data at a point-in-time, the article of manufacture comprising computer readable storage media including at least one computer program embedded therein that is capable of causing a computer to perform:

generating a first data structure indicating point-in-time data at one of a first storage location and a corresponding second storage location, wherein the first and second storage locations comprise physical storage locations on a storage medium;

generating a second data structure indicating point-in-time data at one of a first storage location and corresponding second storage location;

generating a first relationship data structure indicating a relationship between the first storage location and corresponding second storage location;

generating a second relationship data structure indicating a relationship between the first storage location and second storage location;

processing a request with respect to the first storage location by processing the first relationship data structure to determine the corresponding second storage location for the first storage location and processing the first data structure to determine whether data at the first storage location was transferred to the second storage location; and processing a request with respect to the second storage location by processing the second relationship data structure to determine the corresponding first storage location for the second storage location and processing the second data structure to determine whether the point-in-time data at the first storage location was transferred to the second storage location.

29. The article of manufacture of claim 28, wherein the data at the point-in-time comprises multiple storage units of data, wherein the first and second data structures indicate whether each storage unit of point-in-time data is located at one of the first and corresponding second storage locations.

30. The article of manufacture of claim 28, wherein the first and second relationship data structures each indicate a range of first storage locations for storing the point-in-time data and a corresponding range of second storage location for storing the point-in-time data.

31. The article of manufacture of claim 30, wherein the first and second data structures and relationship data structures are established at a first point-in-time, further comprising establishing at a second point-in-time a third relationship data structure indicating a range of third storage locations corresponding to the second storage location, wherein the second point-in-time data is maintained at one of the third storage location and corresponding second storage location.

32. The article of manufacture of claim 28, wherein the first and second data structures and relationship data structures are created in response to a request to copy point-in-time data from the first storage location to the second storage location.

33. The article of manufacture of claim 32, further comprising copying the point-in-time data from the first storage location to the second storage location.

34. The article of manufacture of claim 33, further comprising modifying the first and second data structures to indicate that point-in-time data copied from the first storage location to the second storage location is not located at the first storage location and is located at the second storage location.

35. The article of manufacture of claim 28, further comprising:

receiving an update to point-in-time data;

processing the first data structure to determine whether the point-in-time data to update is at the first storage location;

copying the point-in-time data to update from the first storage location to the corresponding second storage location after determining that the point-in-time data to update is at the first storage location;

modifying the first and second data structures to indicate that the point-in-time data to update is at the second storage location; and updating the point-in-time data at the first storage location.

36. The article of manufacture of claim 35, wherein each storage location comprises corresponding locations in a cache and a storage device, wherein causing the computer to copy the point-in-time data from the first storage location to the corresponding second storage location comprises:

copying the data to the second storage location in cache;

destaging the data at the second storage location in cache to the corresponding location in the storage device, wherein modifying the first and second data structures occurs after destaging the data from the second storage location in cache to the corresponding location in the second storage device.

37. The article of manufacture of claim 35, wherein the first storage location comprises a first logical storage location addressing first physical storage locations including the point-in-time data and the second storage locations comprises a second logical storage location addressing second storage locations, wherein copying the point-in-time data to update comprises copying the data to the corresponding second storage location addressed by the second logical storage locations, and wherein updating the point-in-time data at the source storage location comprises copying the point-in-time data to a new physical location and modifying the first logical storage location addressing the point-in-time data to address the new physical location including the updated point-in-time data.

38. The article of manufacture of claim 28, further comprising:

receiving a request to read point-in-time data from the second storage location;

processing the first data structure to determine whether the requested point-in-time data is at the first storage location;

copying the requested point-in-time data from the first storage location to the corresponding second storage location after determining that the requested point-in-time data is at the first storage location;

modifying the first and second data structures to indicate that the requested point-in-time data update is at the second storage location; and returning the requested point-in-time data from the second storage location.

39. The article of manufacture of claim 38, wherein each storage location comprises corresponding locations in a cache and a storage device, wherein causing the computer to copy the point-in-time data from the first storage location to the corresponding second storage location comprises:

copying the data to the second storage location in cache;

destaging the data at the second storage location in cache to the corresponding location in the second storage device, wherein modifying the first and second data structures occurs after destaging the data from the second storage location in cache to the corresponding second storage location in the storage device, and wherein the requested point-in-time data is returned from the second storage location in cache.

40. The article of manufacture of claim 28, further comprising:

receiving a request to update point-in-time data at the second storage location;

updating the point-in-time data at the second storage location;

determining whether the first and second data structures indicate that the point-in-time data to update is at the first storage location; and indicating in the first and second data structures that the point-in-time data to update is at the second storage location after determining that the first and second data structures indicate that the point-in-time data to update is at the first storage location.

41. A memory device for maintaining electronic data at a point-in-time, comprising:

a first data structure indicating point-in-time data at first storage locations;

a second data structure indicating point-in-time data at second storage locations, wherein a first storage location has a corresponding second storage location, wherein point-in-time data is located at one of the first storage locations and corresponding second storage locations, and wherein the first and second storage locations comprise physical storage locations on a storage medium;

a first relationship data structure indicating a relationship between the first data structure and the first and second storage locations; and a second relationship data structure indicating a relationship between the second data structure and the first and second storage locations.

42. The memory of claim 41, wherein the data at the point-in-time comprises multiple storage units of data, wherein the first and second data structures indicate whether each storage unit of point-in-time data is located at one of the first and corresponding second storage locations.

43. The memory of claim 41, wherein the first and second relationship data structures each indicate a range of first storage locations for storing the point-in-time data and a corresponding range of second storage locations for storing the point-in-time data.

44. The memory of claim 43, wherein the first and second data structures and relationship data structures are established at a first point-in-time, further comprising a third relationship data structure established at a second point-in-time indicating a range of third storage locations corresponding to the first and second storage locations, wherein the second point-in-time data is maintained at one of the first, second, and third storage locations.

* * * * *

UNITED STATES PATENT AND TRADEMARK OFFICE
CERTIFICATE OF CORRECTION

PATENT NO. : 6,611,901 B1
DATED : August 26, 2003
INVENTOR(S) : William Frank Micka, Yoram Novick and David Michael Shackelford It is certified that error appears in the above-identified patent and that said Letters Patent is hereby corrected as shown below:

Column 16,
Line 20, after "data" delete ":".

Signed and Sealed this

Third Day of May, 2005

JON W. DUDAS
*Director of the United States Patent and Trademark Office*